United States Patent [19]
Ganson et al.

[11] Patent Number: 5,579,301
[45] Date of Patent: Nov. 26, 1996

[54] SYSTEM FOR, AND METHOD OF, MANAGING VOICE CONGESTION IN A NETWORK ENVIRONMENT

[75] Inventors: Douglas Ganson; Thomas C. Sheppard, both of Simi Valley, Calif.

[73] Assignee: MICOM Communications Corp., Simi Valley, Calif.

[21] Appl. No.: 203,792

[22] Filed: Feb. 28, 1994

[51] Int. Cl.$^6$ ................................................. H04J 3/14
[52] U.S. Cl. ......................... 370/17; 370/79; 370/84; 370/58.1
[58] Field of Search ..................... 370/60, 60.1, 61, 370/94.1, 84, 94.2, 13, 17, 58.1, 58.2, 58.3, 79, 118, 82; 348/401

[56] References Cited

U.S. PATENT DOCUMENTS

| | | | |
|---|---|---|---|
| 4,652,703 | 3/1987 | Lu et al. | 379/410 |
| 5,115,429 | 5/1992 | Hluchyj et al. | 370/84 |
| 5,313,454 | 5/1994 | Bustini et al. | 370/94.2 |
| 5,317,603 | 5/1994 | Osterweil | 370/118 |
| 5,357,281 | 10/1994 | Ikeda et al. | 348/401 |
| 5,444,707 | 8/1995 | Cerna et al. | 370/118 |

*Primary Examiner*—Wellington Chin
*Assistant Examiner*—Huy D. Vu
*Attorney, Agent, or Firm*—Ellsworth R. Roston; Charles H. Schwartz

[57] ABSTRACT

A first voice channel transmits voice signals into a second voice channel through a plurality of network nodes and data links. Preferably the voice signals are in packets each having a plurality of bits containing voice information and each having at least one additional bit to indicate whether a congestion has been encountered at any of the nodes. Preferably the voice signals in each packet have a particular bandwidth and a particular compression. When a congestion of a packet is encountered at one of the nodes, the node produces at the additional bit in the packet an indication that congestion has occurred. The packet with this indication then passes through the nodes to the second channel. The second channel then produces and sends to the first channel signals acknowledging the reception of the packets and the encountering of congestion. The first channel then reduces the bandwidths of the signals in the packets transmitted to the second channel and increases the compression of the signals in the packets. When the second channel receives these packets without encountering any congestion for at least a particular period of time, it sends a congestion clear signal to the first channel. The first channel then increases the bandwidth of the voice signals in the packets to the particular value and decreases the compression of these signals to the particular value. The second channel decompresses the voice signals in the packets and restores the voice signals to their original values.

27 Claims, 2 Drawing Sheets

SYSTEM FOR, AND METHOD OF, MANAGING VOICE CONGESTION IN A NETWORK ENVIRONMENT

This invention relates to systems for, and methods of, transmitting voice signals without congestion from a first station to a second station through a plurality of network nodes and a plurality of data links. More particularly, the invention relates to a system for, and a method of, regulating the rate of transmission of voice signals from the first station to the second station so that no congestion occurs at any of the network nodes between the first and second stations.

Telecommunications systems involving the transmission of different types of media through telephone lines are becoming increasingly common. For example, systems involving the transmission of processed data, facsimile and voice are becoming increasingly common. The transmission of each type of media involves different parameters. For be in real time. Stated differently, it generally does not matter whether data transmitted at one instant from a first station is received at that instant or at a slightly later instant at a second station.

The transmission and reception of voice information have different criteria. It is generally desirable to transmit and receive voice information in as close to real time as possible. Otherwise, a delay in the transmission of voice from a first station to a second station may cause the delayed information to be received at the second station at the same time that voice information in real time is starting to be transmitted from the second station to the first station. As a result, garbled communication between the two stations may occur.

It is accordingly desirable that voice information be transmitted between first and second stations in real time without any congestion of the information at any network node between the stations. This has not been provided until now. Until now, when information has become congested at a network node between the first and second stations, the congestion has continued until the system has been able to work itself out of the congestion. This situation has existed even though a considerable effort has been made to resolve the problem.

This invention provides a system for, and a method of, instantaneously eliminating congestion in voice signals transmitted from a first voice channel to a second voice channel through network nodes and data links. In one embodiment of the invention, a first channel transmits voice signals into a second channel through a plurality of network nodes and data links. Preferably the voice signals are in packets each having a plurality of bits containing voice information and each having at least one additional bit to indicate whether a congestion has been encountered at any of the nodes. Preferably the voice signals in each packet have a particular bandwidth and a particular compression. When a congestion of a packet is encountered at one of the nodes, the node produces at the additional bit in the packet an indication that congestion has occurred. The packet with this indication then passes through the nodes to the second station.

The second channel then produces and sends to the first channel signals acknowledging the reception of the packets and the encountering of congestion. The first channel then reduces the bandwidths of the signals in the packets transmitted to the second channel and increases the compression of the signals in the packets. When the second channel receives these packets without encountering any congestion for at least a particular period of time, it sends a congestion clear signal to the first channel. The first channel then increases the bandwidth of the voice signals in the packets to the particular value and decreases the compression of these signals to the particular value. The second channel decompresses the voice signals in the packets and restores the voice signals to their original values.

Figure 1:
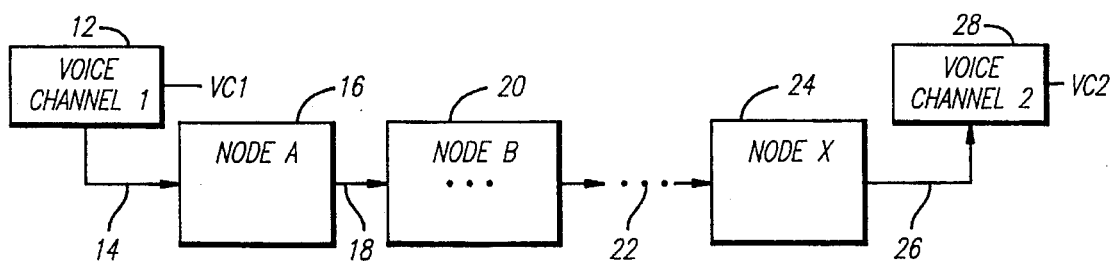
FIG. 1 is a system, primarily in block form, schematically illustrating an embodiment of a telecommunications system.

A telecommunications system generally indicated at 10 is shown on a simplified basis in FIG. 1. The telecommunications system 10 includes a voice channel 12 for providing voice signals in a manner well known in the art. The voice 12 may also provide other types of information such as data and facsimile in a manner well known in the art. The voice channel 12 passes the voice signals through a data link 14 such as telephone wires to a network node 16 (node A) which may be constructed in a manner well known in the art. The network node 16 may be a repeater in the general sense. It may constitute a central hub or a voice channel as in the voice channel 12. The voice channel 12 is indicated as "Voice Channel 1" or "VC1" in the drawings.

A data link 18 is shown as being attached to the network node 16. A network node 20 (node B) is in turn attached to the data link 18. As shown by broken lines 22, a plurality of data links and network nodes may be included in the system 10. The last network node in the system 10 is indicated at 24 (node x). A data link 26 extends from the network node 24 to a voice channel 28 which may be similar to that at the voice channel 12. Voice signals may be transmitted in a conventional manner from the voice channel 12 to the voice channel 28. The voice channel 28 is indicated as "Voice Channel 2" or "VC2" in the drawings.

Figure 2:
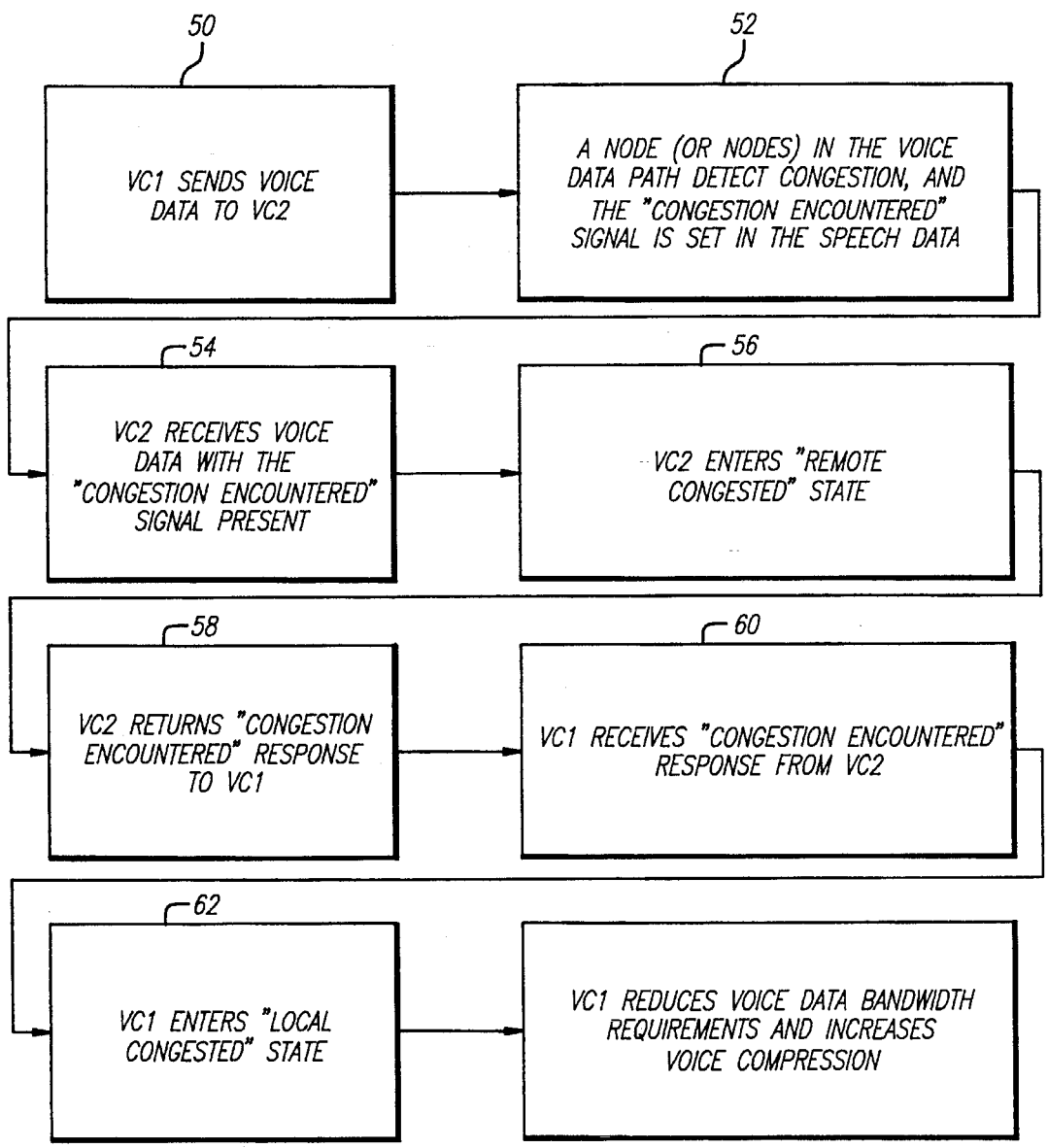
FIG. 2 is a schematic block diagram of a system for detecting, and adjusting to, congestion of voice signals in the telecommunications system shown in FIG. 1.

The system shown in FIG. 2 detects congestion of voice signals at any one of the network nodes such as the nodes 16, 20 and 24 and adjusts the bandwidth of the voice signals transmitted from the voice channel 12 to the voice channel 28 in accordance with such detection. The voice signals may be in the form of packets in a manner well known in the art. The packets may occur in a sequence. Each packet may have a plurality of binary bits representing voice information.

Each packet may also contain an additional binary bit indicating whether congestion has occurred at one of the network nodes 12, 20 and 24 in the transmission of the packets from the voice channel 12 to the voice channel 28. For example, the use of packets to provide voice information is disclosed in U.S. Pat. No. 5,187,591 issued on Feb. 16, 1993, to Kenneth R. Guy, Andrew M. Kameya and Herbert M. Wildfeuer for a "System for Transmitting and Receiving Aural Information and Modulated Data" and assigned of record to the assignee of record of this application.

The packets of voice information may be initially transmitted from the voice channel 12 with a particular bandwidth and at a particular compression. The compression is related to the bandwidth. In other words, as the bandwidth of the voice information in the packets is increased, more information can be transmitted per unit of time than with a decreased bandwidth. This allows the compression of the voice information in the packets to be reduced as the bandwidth of the voice information in the channels is increased.

Each packet of voice information may contain bits at the beginning of the packet to identify that the packet contains voice information as distinguished from other types of information such as data or facsimile. Furthermore, the voice information in each packet may be in digital form. As a result, the voice information in each packet may be converted from an analog form to a digital form before it is transmitted from the station 12 to the station 28. Separate bits may be provided at the end of each packet and may be coded with a particular binary pattern to identify the end of the packet. The transmission of the packets of voice information from the voice channel 12 to the voice channel 28 is indicated at 50 in FIG. 2.

When the packets of voice information are sent from the voice channel 12 at the particular bandwidth and with the particular compression, they may encounter congestion at one of the network nodes 16, 20 and 24. This may be detected at such network node by an inability of such network node to process packets of the voice information passing to such network node. For example, congestion may occur at the network node 20. The network node 20 may detect such congestion by an inability of the network node to process such information at the time that it receives such packets. The congestion may be detected by a back-up of one or a plurality of packets of the voice information at the network node.

Preferably a congestion occurs when there is a delay at the network node 20 in the transmission of only a single packet of voice information. A congestion is preferably indicated at this time because any delay prevents the voice information from passing from the voice channel 12 to the voice channel 28 in real time. Alternatively, the congestion may be indicated when there is at least a particular time delay in the passage of the packets of voice information through the network node 20.

When one of the network nodes such as the node 20 detects a congestion in the packets of voice information passing to the node, it produces a binary indication at the particular position reserved in the packet to indicate congestion. For example, the network node 20 may produce a binary "1" at this particular position to indicate congestion. The detection of congestion at a node such as the node 20 is indicated at 52 in FIG. 2. The packet with the binary indication of "1" at the particular position then passes through the nodes including the node 24 to the voice channel 28. This is indicated at 54 in FIG. 2.

The voice channel 28 receives the packets of voice information with the binary "1" at the particular position to indicate congestion. The voice channel 28 does not know the particular node in the sequence where the congestion has occurred. It knows only that congestion has occurred at one of the nodes. When the voice channel 28 receives the "congestion encountered" signal, it enters a "remote congested" state at the voice channel. This is indicated at 56 in FIG. 2.

The voice channel 28 then transmits a message through the network nodes (e.g. 24, 20, 16) to the voice channel 12. This transmission acknowledges the receipt by the voice channel 28 of the packets of voice information. It also indicates that congestion has been encountered at one of the network nodes between the voice channel 12 and the voice channel 28. This may be provided as by a binary "1" at a particular bit position in the acknowledgement. This transmission is indicated at 58 in FIG. 2.

When the voice channel 12 receives the "message acknowledged" message from the voice channel 28 as indicated at 60 in FIG. 2, it enters a "local congested" state into the voice channel. This entry is indicated at 62 in FIG. 2. This "local congested" state may be provided by a pattern of signals in the voice channel 12. While the voice channel 12 is in the "local congested" state, it transmits the packets of voice information with a reduced bandwidth relative to the particular bandwidth of the voice signals previously transmitted. When the bandwidth is reduced, the compression is correspondingly increased to compensate for the reduced bandwidth. The transmission of voice information from the voice channel 12 to the voice channel 28 with reduced bandwidth and increased compression is indicated at 70 in FIG. 3.

The packets of voice information transmitted from the voice channel 12 at the reduced bandwidth and with the increased compression pass through the network nodes (e.g. 16, 20 and 24) without any congestion. The reduced bandwidth of the voice information in the packets tends to eliminate any congestion in the network nodes 16, 20 and 24. This is indicated at 72 in FIG. 3. This is indicated by a binary value of "0" at the particular position in the packets.

When the voice channel 28 has received (as indicated at 74) the packets of voice information, each with an indication of no congestion, for a particular period of time, the voice channel 28 produces a "congestion clear" indication. This is indicated at 76 in FIG. 3.

Figure 3:
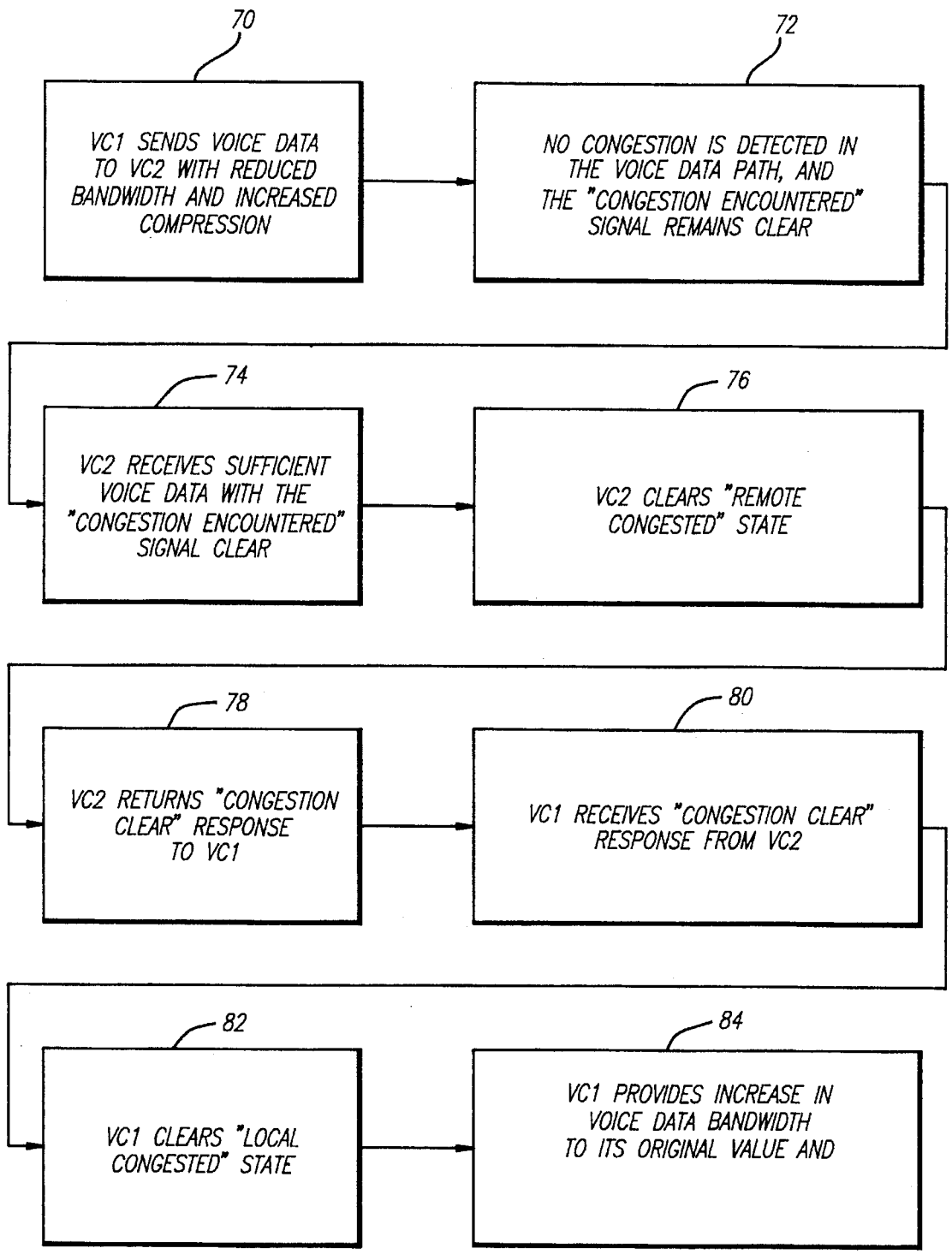
FIG. 3 is a schematic block diagram of a system for detecting, and adjusting to the clearance of congestion in the telecommunications system shown in FIG. 1.

The voice channel 28 transmits the "congestion clear" indication to the voice channel 12 through the network nodes (e.g. 16, 20, 24), as indicated at 78 in FIG. 3. The voice channel 12 then receives the "congestion clear" signal (80 in FIG. 3) and clears the "local congested" state in the voice channel as indicated at 82 in FIG. 3. The voice channel 12 then transmits the packets of voice information at the particular bandwidth and with the particular compression until a congestion is again encountered in one of the network nodes (e.g. 16, 20, 24). This is indicated at 84 in FIG. 3.

In this way, the voice information is transmitted at each instant from the voice channel 12 to the voice channel 28 with an optimal bandwidth and with a minimal compression to eliminate any congestion in the nodes 16, 20 and 24. This provides an optimal voice quality at the voice channel 28 at each instant. It will be appreciated that a similar system to that shown above may be provided for the transmission of voice information or data from the voice channel 28 to the voice channel 12 through the nodes 24, 20 and 16.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a method of preventing congestion in the transmission of voice signals between first and second voice channels through a network including network nodes and data links between the network nodes and between the network nodes and the channels, the steps of:

providing the voice signals with a particular bandwidth at the first channel, sending the voice signals with the particular bandwidth through the data links and the network nodes to the second channel, detecting congestion of the voice signals at an individual one of the network nodes, generating a congestion encountered signal at the individual one of the nodes for transmission through the data links and the nodes to the second channel, transmitting a congestion encountered signal from the second channel to the first channel, reducing below the particular bandwidth the voice signals provided at the first channel for transmission to the second channel, providing a particular level of data compression for the voice signals sent with the particular bandwidth from the first channel to the second channel, and increasing the data compression for the voice signals at the first channel when the bandwidth of the signals is reduced below the particular bandwidth at the first channel, generating a congestion encountered state at the second channel when the congestion is encountered at one of the network nodes, eliminating the congestion encountered state at the second channel when the first channel has sent the voice signals with the reduced bandwidth for a particular period of time without any congestion in any of the nodes, and transmitting a signal from the second channel to the first channel to indicate the elimination of the congestion encountered state at the second channel when the second channel eliminates the congestion encountered state in the second channel.

2. In a method as set forth in claim 1, comprising the steps of:

providing the voice signals with the particular bandwidth and the particular level of data compression in the first channel when the first channel receives an indication from the second channel that the congestion encountered state has been eliminated at the second channel, and thereafter transmitting the voice signals with the particular bandwidth and the particular level of data compression from the first channel to the second channel.

3. In a method of preventing congestion in the transmission of voice signals between first and second telephone channels through a network including network nodes and data links between the network nodes and between the network nodes and the channels, comprising the steps at the second channel of:

receiving a congested encountered signal from an individual one of the nodes between the first and second channels when packets of voice signals are transmitted from the first channel in a particular bandwidth and with a particular compression, entering a remote congested state in the second channel after receiving a congestion encountered signal from the individual one of the thereafter transmitting the congestion encountered signal to the first channel to provide for the reduction in the bandwidth from the particular value and the increase in the compression from the particular value in the voice signals transmitted from the first channel to the second channel, receiving the packets of the voice signals transmitted from the first channel at the reduced bandwidth and the increased compression, providing a congestion clear signal when the second channel receives, without any congestion continuously for a particular period of time, the packets of the voice signals transmitted by the first channel at the reduced bandwidth and the increased compression, and thereafter transmitting the congestion clear signal to the first channel to obtain the transmission of the packets of voice signals from the first channel to the second channel at the particular bandwidth and with the particular compression.

4. In a method as set forth in claim 3, comprising the step at the second channel of:

receiving the packets of the voice signals at the particular bandwidth and with the particular compression after transmitting the congestion clear signal to the first channel.

5. In a method as set forth in claim 3, comprising the step at the second channel of:

clearing the remote congested state in the second channel after receiving without any congestion continuously for the particular period of time, the packets of the voice signals transmitted by the first signals at the reduced bandwidth and the increased compression and before transmitting the congestion clear signal.

6. In a method of preventing congestion in the transmission of voice signals between first and second telephone channels through a network including network nodes and data links between the network nodes and between the network nodes and the channels, the steps at the second channel of:

receiving a congested encountered signal from an individual one of the nodes between the first and second channels when voice signals are transmitted from the first channel in a particular bandwidth and with a particular compression, transmitting the congestion encountered signal to the first channel to provide for the reduction in the bandwidth from the particular value and the increase in the compression from the particular value in the voice signals transmitted from the first channel to the second channel, receiving the voice signals transmitted from the first channel at the reduced bandwidth and the increased compression, providing a congestion clear signal when the second channel receives, without any congestion for a particular period of time, the voice signals transmitted by the first channel at the reduced bandwidth and the increased compression, transmitting the congestion clear signal to the first channel to obtain the transmission of the voice signals from the first channel to the second channel at the particular bandwidth and with the particular compression, entering a remote congested state in the second channel after receiving a congested encountered signal from the individual one of the nodes and before transmitting the congested encountered signal to the first channel, and providing a congestion clear state when the second channel receives, without any congestion for a particular period of time, the voice signals transmitted by the first channel at the reduced bandwidth and the increased compression before it transmits the congestion clear signal to the first channel.

7. In a method of preventing congestion in the transmission of voice signals between first and second telephone channels through a network including network nodes and data links between the network nodes between the network nodes and the channels, comprising the steps of:

providing successive packets of voice signals each containing a plurality of bits representing voice information in compressed form and each containing at least one particular bit indicating whether or not congestion has been encountered, detecting the encounter of congestion at an individual one of the different nodes between the first channel and the second channel, indicating in the particular bit in the packet the encounter of congestion at one of the different nodes between the first channel and the second channel;

receiving the packets at the second channel with the particular bit indicating the encounter of congestion, sending from the second channel to the first channel an acknowledgement of the sending of the successive packets of voice signals, the acknowledgement including an indication of the encounter of congestion in the transmission of the packets of voice signals between the first and second channels, and thereafter sending the successive packets of voice signals at a reduced bandwidth and with an increased compression from the first channel to the second channel.

8. In a method as set forth in claim 7, comprising the steps of:

removing the indication of the encounter of congestion in the particular bit in the packets when the congestion at the nodes has been removed, and thereafter sending from the second channel to the first channel the acknowledgement with the particular bit indicating that the congestion has been removed.

9. In a method as set forth in claim 7, comprising the steps of:

indicating at the second channel the encounter of congestion between the first and second channels when an encounter of congestion is detected at one of the nodes between the first and second channels, and removing the indication at the second channel of the encounter of congestion between the first and second channels when there is no encounter of congestion at the nodes between the first and second channels for a particular period of time.

10. In a method as set forth in claim 9, comprising the steps of:

transmitting a congestion clear signal from the second channel to the first channel when the indication of the encounter of congestion is removed at the second channel, and increasing the bandwidth of the voice signals at the first channel when the congestion clear signal is transmitted from the second channel to the first channel.

11. In a method of preventing congestion in the transmission of voice signals between first and second telephone channels through a network including network nodes and data links between the network nodes and between the network nodes and the telephone channels, the steps at the first channels of:

providing successive packets of voice signals each containing bits indicating the characteristics of the voice signals in the packets and each providing at least one additional bit to indicate the presence or absence of packet congestion at any one of the successive nodes between the first and second channels and each having a particular bandwidth, receiving an acknowledgement from the second channel of the receipt at the second channel of the packets of voice signals, each acknowledgement containing an indication of the presence or absence of packet congestion at any one of the successive nodes between the first and second channels, reducing below the particular bandwidth the bandwidth of the voice signals in the packets transmitted from the first channel to the second channel when the first channel receives an acknowledgement with an indication of the presence of packet congestion at one of the successive nodes between the first and second channels, providing the voice signals in each packet with a particular compression when the voice signals have the particular bandwidth, and providing the voice signals in each packet with an increased compression greater than the particular compression when the voice signals have a bandwidth less than the particular bandwidth.

12. In a method as set forth in claim 11, comprising the steps at the first channel of:

providing an indication of a congestion in one of the nodes between the first and second channels when the first channel receives a congestion encountered signal from the second channel, and removing the indication in the channel of the congestion in one of the nodes when the second channel transmits to the first channel an indication that the congestion has been cleared.

13. In a method of preventing congestion in the transmission of voice signals between first and second telephone channels including network nodes and data links between the network nodes and between the network nodes and the telephone channels, comprising the steps at the second channel of:

receiving the voice signals in successive packets at a particular bandwidth and with a particular compression after the travel of these signals from the first channel through the network nodes and the data links to the second channel, each of the packets having a plurality of bits representing voice information and at least one particular bit representing the occurrence of congestion or lack of congestion of the packets of voice signals in the network nodes and the data links, acknowledging to the first channel the reception of the packets of voice signals from the first channel at the particular bandwidth and with the particular compression and any indication in such packets of the congestion of the voice signals, and thereafter receiving the packets of the voice signals from the first channel, at a reduced bandwidth relative to the particular bandwidth and an increased compression relative to the particular compression, of the voice signals in the packets when the second channel provides an indication to the first channel of a congestion in the voice signals in the network nodes and the data links.

14. In a method as set forth in claim 13, comprising the steps at the second channel of:

receiving the packets of voice signals at the reduced bandwidth relative to the particular bandwidth and at the reduced compression relative to the particular compression for a particular period of time without any indication in the packets of congestion, and thereafter sending to the first channel an indication that the occurrence of congestion has been cleared.

15. In a combination as set forth in claim 14, comprising the steps at the second channel of:

producing a congestion encountered signal before the acknowledgement of such encounter of congestion to the first channel, and removing the congestion encountered indication when the packets of voice signals have been received for the particular period of time without any indication of congestion.

16. In a method as set forth in claim 11, comprising the steps at the first channel of:

increasing the bandwidth to the particular bandwidth, and reducing the compression to the particular compression, when the first station receives an acknowledgement from the second station that the packet congestion has been eliminated at the second station.

17. In a method as set forth in claim 14, comprising the step at the second channel of:

thereafter receiving the packets of voice signals from the first channel at the particular bandwidth and with the particular compression after sending to the first channel the indication that the occurrence of congestion has been cleared.

18. In a method of preventing congestion in the transmission of voice signals between first and second voice channels through a network including network nodes and data links between the network nodes and between the network nodes and the channels, comprising the steps of:

providing the voice signals with a particular bandwidth and with a particular compression at the first channel, sending the voice signals with the particular bandwidth and the particular compression from the first channel through the data links and the network nodes to the second channel, detecting congestion of the voice signals at an individual one of the network nodes, generating a congestion encountered signal at the individual one of the nodes for transmission through the data links and the nodes to the second channel, transmitting a congestion encountered signal from the second channel to the first channel when the congestion encountered signal is received at the second channel, the congestion encountered signal indicating only the existence or lack of existence of a congestion, and reducing below the particular bandwidth the voice signals provided at the first channel for transmission to the second channel and simultaneously increasing the compression of the voice signals at the first channel above the particular compression, and thereafter transmitting a signal from the second channel to the first channel, after the transmission by the first channel of the signals at the reduced bandwidth and the increased compression for a particular period of time and the reception of such signals at the second channel, to indicate that the congestion encountered state at the second channel has been eliminated.

19. In a method of preventing congestion in the transmission of voice signals between first and second telephone channels through a network including network nodes and data links between the network nodes and between the network nodes and the telephone channels, comprising the steps at the first channel of:

providing at the first channel successive packets of voice signals each containing binary bits indicating the characteristics of the voice signals in the packets and each having a particular bandwidth and a particular compression, receiving at the first channel an acknowledgement from the second channel of the receipt at the second channel of the packets of voice signals, each acknowledgement containing an indication in an additional binary bit of the presence or absence of packet congestion at any one of the successive nodes between the first and second channels, reducing below the particular bandwidth at the first channel the bandwidth of the voice signals in the packets transmitted from the first channel to the second channel, and increasing the compression of the voice signals above the particular compression, when the first channel receives an acknowledgement from the second channel with an indication in the additional binary bit of the presence of packet congestion at one of the successive nodes between the first and second channels, and increasing the bandwidth of the voice signals at the first channel to the particular bandwidth, and reducing the compression of the voice signals to the particular compression, when the first channel receives an acknowledgement from the second channel in the additional binary bit that the packet congestion has been eliminated at the second channel.

20. In a method of preventing congestion in the transmission of voice signals between first and second voice channels through a network including network nodes and data links between the network nodes and between the network nodes and between the channels, comprising the steps of:

providing the voice channels at the first channel with a particular bandwidth and a particular compression, sending the voice signals from the first channel with the particular bandwidth and the particular compression through the data links and the network nodes to the second channel, detecting congestion of the voice signals at an individual one of the network nodes, generating a congestion encountered signal at the individual one of the network nodes for transmission through the data links and the network nodes to the second channel, entering a remote congested state at the second channel when a congestion encountered signal is generated at the individual one of the network nodes, sending a congestion encountered signal from the second channel to the first channel, the congestion encountered signal indicating only the entering or lack of entering of the remote congested state at the second station, entering at the first channel the congested encountered signal transmitted from the second channel, and reducing the bandwidth of the voice signals below the particular bandwidth and increasing the compression of the voice signals above the particular compression, in response to the local congested state entered at the first channel, in the voice signals sent from the first channel to the second channel.

21. In a method as set forth in claim 20, further comprising the step of:

sending the voice signals at the reduced bandwidth and the increased compression from the first channel to the second channel, and clearing the remote congested state at the second channel when the second channel receives the voice signals from the first channel at the reduced bandwidth and the increased compression for a particular period of time without the generation at the second channel of any congestion encountered signal.

22. In a method as set forth in claim 21, additionally comprising the step of:

sending a congestion clear signal from the second channel to the first channel when the second channel clears the remote congested state in the second channel.

23. In a method as set forth in claim 22, additionally comprising the step of:

clearing the local congested signals from the first channel when the first channel receives the congestion clear signal from the second channel.

24. In a method as set forth in claim 22, clearing the local congested state at the first channel when the first channel receives the congestion clear signal from the second channel, and increasing to the particular bandwidth the bandwidth of the voice signals, and reducing to the particular compression the compression of the voice signals, sent from the first channel to the second channel when the local congested state is cleared at the first channel.

25. In a method of preventing congestion in the transmission of voice signals between first and second telephone channels including network nodes and data links between the network nodes and between the network nodes and the telephone channels, comprising the steps at the second channel of:

receiving the voice signals in successive packets at a particular bandwidth and a particular compression after the travel of these signals from the first channel through the network nodes and the data links to the second channel, each of the packets having a plurality of bits representing voice information and at least one particular bit representing the occurrence or lack of occurrence of congestion of the packets of voice signals in the network nodes and the data links, entering a remote congested state in the second channel when congestion has been encountered in one of the network nodes and data links between the first and second channels, returning a congestion encountered signal from the second channel to the first channel, the congestion encountered signal indicating only the entering or lack of entering of the remote congested state in the second station, receiving the packets of the voice signals from the first channel, at a reduced bandwidth and an increased compression relative to the particular bandwidth and the particular compression, after the return of the congestion encountered signal from the second channel to the first channel, and clearing the remote congested state in the second channel after the second channel has received the voice signals from the first channel at the reduced bandwidth and the increased compression for a particular period of time without any congestion.

26. In a method as set forth in claim 25, comprising the additional step at the second channel of:

returning a congestion clear signal to the first channel after clearing the remote congested state in the second channel.

27. In a method as set forth in claim 26, comprising the additional step at the second channel of:

receiving the packets of the voice signals from the first channel at the particular bandwidth and the particular compression after returning the compression clear signal to the second channel.

\* \* \* \* \*